United States Patent [19]

Sakunaga et al.

[11] Patent Number: 4,768,857

[45] Date of Patent: Sep. 6, 1988

[54] MULTIFILAMENT TYPE PLASTIC OPTICAL FIBER

[75] Inventors: Kenichi Sakunaga; Hiromu Terada; Yoshiro Nieda, all of Otake; Naoyuki Fukahori, Ayase, all of Japan

[73] Assignee: Mitsubishi Rayon Company Ltd., Tokyo, Japan

[21] Appl. No.: 99,766

[22] Filed: Sep. 22, 1987

[30] Foreign Application Priority Data

Sep. 22, 1986 [JP] Japan .................................. 61-221781

[51] Int. Cl.$^4$ .......................... G02B 6/04; B29D 11/00
[52] U.S. Cl. .............................. 350/96.24; 350/96.10; 264/1.5
[58] Field of Search .......................................... 264/1.5; 350/96.24–96.27, 96.29, 96.34

[56] References Cited

U.S. PATENT DOCUMENTS 3,767,372 10/1973 Elliot ............................... 350/96.24
4,381,269 4/1983 Kaino et al. ......................... 264/1.5

FOREIGN PATENT DOCUMENTS 2543311 9/1984 France ................................ 264/1.5
0008104 1/1981 Japan ................................. 264/1.5

*Primary Examiner*—William L. Sikes
*Assistant Examiner*—Georgia Y. Epps
*Attorney, Agent, or Firm*—Oblon, Fisher, Spivak, McClelland & Maier

[57] ABSTRACT

A multifilament type plastic optical fiber having a substantially uniform cross-section and an islands-in-sea structure, in which 10 to 10,000 islands are arranged in the sea, the respective islands have a substantially uniform cross-section having a diameter of 10 to 200$\mu$ and the sea occupancy ratio in the cross-section of the optical fiber is 5 to 40%, said optical fiber being prepared by constructing a true conjugate spinning spinneret by (a) an orifice plate having 10 to 10,000 core-forming holes, (b) an orifice plate having 10 to 10,000 sheath-forming holes and (c) an orifice plate having 10 to 10,000 sea-forming holes having an opening expanded downward, the lower ends of every two adjacent sea-forming holes having contacted with each other on the lower end face of said orifice plate, so that a fiber comprising the sea and islands having a core-sheath structure is formed by true conjugate spinning without using a filament-gathering orifice plate, supplying a core-forming polymer, a sheath-forming polymer and a sea-forming polymer to respective spinning holes, melt-spinning the polymers under such conditions that the spinning draft D defined by the following formula [I]:

$$D = (\text{hole diameter of core-forming orifice plate})^2/(\text{core}$$

diameter of multifilament optical fiber)$^2$ . . . [I] is 20 to 50,000, fusion-bonding the spun filaments on the lower end face of the spinneret, and taking up the formed fiber.

6 Claims, 4 Drawing Sheets

MULTIFILAMENT TYPE PLASTIC OPTICAL FIBER

BACKGROUND OF THE INVENITON

1. Field of the Invention

The present invention relates to a multifilament type plastic optical fiber having in the cross-section thereof 10 to 10,000 islands having light-transmitting characteristics, which is valuable as an image-transmitting optical fiber or a light guide.

2. Description of the Related Art

A multifilament type plastic optical fiber is advantageous over a multifilament type optical fiber comprising glass type filaments in that the flexibility is high, the handling property is good and individual filaments constituting the multifilament type optical fiber are not broken by bending. Accordingly, development and utilization of multifilament type plastic optical fibers have been attempted. For example, the processes disclosed in U.S. Pat. No. 3,556,635 and Japanese Unexamined Patent Publication No. 56-39505 are known.

The multifilament type plastic optical fiber disclosed in U.S. Pat. No. 3,556,635 is prepared according to a process in which spinning is carried out in a spinning apparatus as shown in FIG. 1 of this U.S. patent, to which a spinning nozzle having a structure as shown in FIG. 2 of this U.S. patent is attached. Accordingly, this multifilament type plastic optical fiber has an angular cross-section in which light-transmitting islands having a substantially rectangular cross-section are arranged, as shown in FIG. 3 of the U.S. patent.

This multifilament type plastic optical fiber is defective in that since the cross-section of the light-transmitting islands exerting the light-transmitting function is rectangular, the light transmission characteristics are insufficient.

Japanese Unexamined Patent Publication No. 56-39505 discloses a process for the preparation of a multifilament type plastic optical fiber, and it is taught that a spinneret disclosed in Japanese Unexamined Patent Publication No. 54-116417 is used for the production of this multifilament type plastic optical fiber. The sectional structure of this spinneret is as shown in FIG. 3 of the accompanying drawings. Referring to FIG. 3, according to this known process, a core-forming polymer is supplied from 31, a sheath-forming polymer is supplied from 32 and a sea-forming polymer is supplied from 33, a three-layer true conjugate yarn is spun from 34 and gathered and integrated in a gathering hole 36 of a gathering orifice plate 34 to obtain a multifilament type plastic optical fiber. According to this process, if the occupancy ratio of the sea in the cross-section of the multifilament type plastic optical fiber is at least 40%, that is, the number of the light-transmitting islands is small, the islands are relatively uniform in the cross-sectional shape, but the element density of the image transmitted by this optical fiber is low and no practically good result can be obtained. If a multifilament type plastic optical fiber in which the occupancy ratio of the seal is lower than 10% is prepared according to this process, the cross-section of the islands present in the peripheral portion of the cross-section of the optical fiber is tetrasonal or heptagonal, as shown in FIG. 4 of the accompany drawings, but islands present in the interior of the cross-section of the optical fiber have heptagonal to nonagonal cross-sections. Transmission of an image is substantially impossible by this optical fiber, and the respective islands constituting the multifilament type plastic optical fiber are different from one another in the light-transmitting characteristics and the light quantity unevenness over the entire section is inevitably large.

SUMMARY OF THE INVENTION

We made research with a view to developing a multifilament type plastic optical fiber free of the foregoing defects, and as a result, it was found that this object can be attained by using a spinneret, as shown in FIG. 2, not equipped with a gathering orifice plate, and fusion-bonding a three-layer true conjugate yarn spun from the spinneret just below the spinneret. We have now completed the present invention based on this finding.

More specifically, in accordance with the present invention, there is provided a multifilament type plastic optical fiber having a substantially uniform cross-section and an islands-in-sea structure, in which 10 to 10,000 islands are arranged in the sea, the respective islands have a substantially uniform cross-section having a diameter of 10 to 200 $\mu$ and the sea occupancy ratio in the cross-section of the optical fiber is 5 to 40%, said optical fiber being prepared by constructing a true conjugate spinning spinneret by (a) an orifice plate having 10 to 10,000 core-forming holes, (b) an orifice plate having 10 to 10,000 sheath-forming holes and (c) an orifice plate having 10 to 10,000 sea-forming holes having an opening expanded downward, the lower ends of every two adjacent sea-forming holes being contacted with each other on the lower end face of said orifice plate, so that a fiber comprising the sea and islands having a core-sheath structure is formed by true conjugate spinning without using a filamentgathering orifice plate, supplying a core-forming polymer, a sheath-forming polymer and a sea-forming polymer to respective spinning holes, melt-spinning the polymers under conditions such that the spinning draft D defined by the following formula [I]:

$$D = \text{(hole diameter of core-forming orifice plate)}^2/\text{(core diameter multifilament optical fiber)}^2 \quad \ldots \quad [I].$$

is 20 to 5,000, fusion-bonding the spun filaments on the lower end face of the spinneret, and taking up the formed fiber.

DESCRIPTION OF THE PREFERRED EMBODIMENTS

Preferably, the multifilament type plastic optical fiber of the present invention has a uniform cross-section and an islands-in-sea structure, in which 10 to 10,000 islands are arranged in the sea, the respective islands have a substantially uniform cross-section having a diameter of 10 to 200 μ and the sea occupancy ratio in the cross-section of the optical fiber is 5 to 20%. More preferably, in the multifilament type plastic optical fiber of the invention, the cross-sections of the islands having a core-seath structure, which are arranged in the cross-section of the optical fiber, have a substantially circular or hexagonal shape, and the islands are arranged in a zig-zag-stacked structure.

Figure 1:
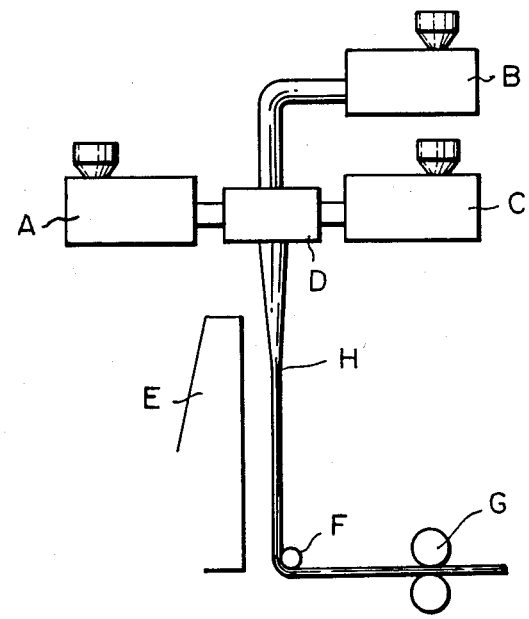
FIG. 1 is a diagram illustrating a spinning apparatus used in the present invention for producing a multifilament type plastic optical fiber.

FIG. 1 is a diagram illustrating the steps of preparing the multifilament type plastic optical fiber according to the present invention, and in FIG. 1, symbols A, B, C, D, E, F, G and H represent a core-forming polymer-supplying extruder, a sheath-forming polymer-supplying extruder, a sea-forming polymer-supplying extruder, a spinneret, a cooler, a guide roll, take-up roll and a spun multifilament type plastic optical fiber, respectively.

Figure 2:
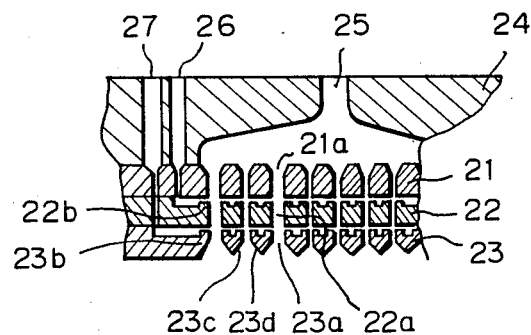
FIG. 2 is a diagram illustrating the cross-section of a spinneret of the spinning apparatus shown in FIG. 1.

FIG. 2 is a diagram illustrating the cross-section of the spinneret D, and reference numeral 24 represents a distributing plate for distributing the core-forming polymer, sheath-forming polymer and sea-forming polymer constituting the multifilament type plastic optical fiber, reference numeral 25 represents a core-forming polymer-supplying hole, reference numeral 26 represents a sheath-forming polymer-supplying hole, reference numeral 27 represents a sea-forming polymer-supplying hole, reference numeral 21 represents a core-forming orifice plate, reference numeral 21a represents a core-forming nozzle hole, reference numeral 22 represents a sheath-forming orifice plate, reference numeral 22a represents a sheath-forming nozzle hole, reference numeral 23 represents a sea-forming orifice plate, and reference numeral 23a represents a sea-forming nozzle hole. The core-forming polymer supplied from 21a forms a molten polymer stream having a substantially circular section and is spun out from 22a through 23a. The sheath-forming polymer supplied from 26 overflows a circular projection 22b circularly surrounding the lower end of the core-forming nozzle hole and is bonded in a uniform thickness to the periphery of the core-forming polymer stream while forming an island, and the so-formed island is delivered to the sea-forming nozzle hole 23a. The sea-forming polymer supplied from 27 overflows a circular projection surrounding the lower end of the sheath-forming nozzle hole, flows downward while adhering to the periphery of the sheath-forming polymer, further flows down along a downwardly expanded oblique side wall formed on the lower end face of the sea-forming orifice plate, and fusion-bonds the islands, that is, sheath-core filaments, to one another while filling the spaces among the islands, whereby a prototype of the multifilament type plastic optical fiber of the present invention is formed.

Figure 5:
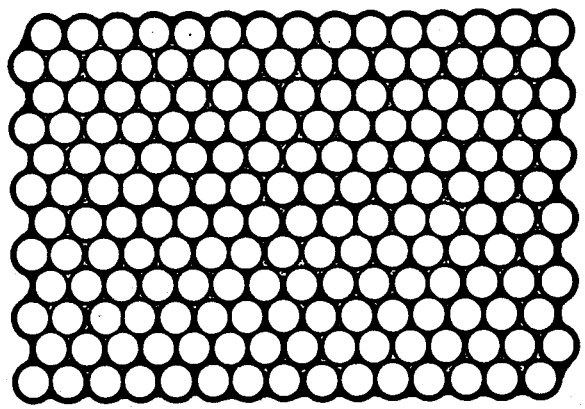
FIGS. 5 and 6 are sectional views showing examples of the multifilament type plastic optical fiber of the present invention.
Figure 6:
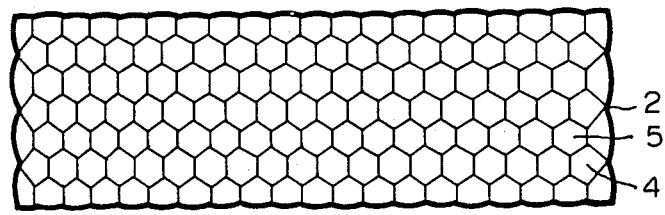

In the present invention, a plurality of core/sheath-/sea three-component true conjugate structures are formed within the spinneret, and then, these structures are fusion-bonded to one another on the lower end face of the sea-forming orifice plate and taken up. Thus, a multifilament type plastic optical fiber in which the islands present in the cross-section of the fiber have a uniform cross-sectional shape, as shown in FIG. 5 or 6, is obtained. In order to prepare this multifilament type plastic optical fiber, it is necessary that the shape of the spinneret, especially the shape of the lower end face of the sea-forming orifice plate, should be specified so that the spinning draft D defined by the above-mentioned formula [I] is 20 to 5,000.

Figure 3:
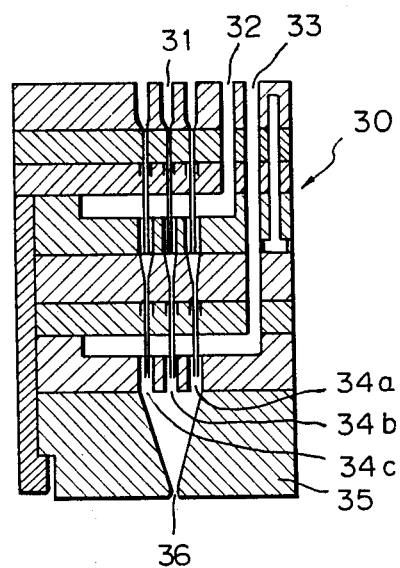
FIG. 3 is a sectional view showing the conventional spinning apparatus.
Figure 4:
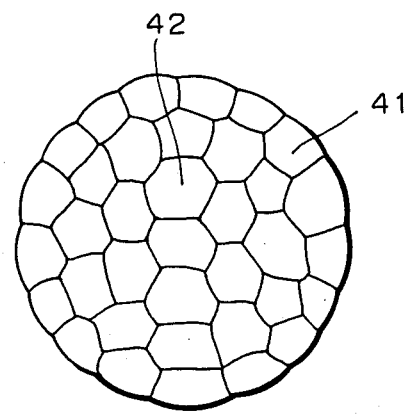
FIG. 4 is a sectional view of the conventional multifilament type plastic optical fiber.

By thus setting the spinning draft to 20 or more, fusion-bonding and integration of the true conjugate yarns on the lower end face of the spinneret can be performed very smoothly. In the process for preparing a multifilament type plastic optical fiber by using the conventional composite spinneret as shown in FIG. 3, an island of the core-sheath structure is formed by a core supplied from 31 and a sheath supplied from 32, and then, a polymer supplied from 33 forms the sea surrounding the island. Thus, individual true conjugate yarns are spun out from the lower ends 34a, 34b and 34c of the spinneret and are gathered and integrated by a gathering hole 36 of a gathering orifice plate 35. Accordingly, the multifilament type plastic optical fiber having a plasticity undergoes a strong force acting toward the interior from the outside, and therefore, the cross-sectional shapes of the islands inevitably become irregular and polygonal, as shown in FIG. 4. In contrast, in the present invention, by using a spinneret having a cross-sectional structure as shown in FIG. 2 and setting the spinning draft at 20 to 5,000, many extrudates having a true conjugate structure comprising an island of the core-sheath structure and the sea surrounding the island flow down along downwardly expanded inclined faces 23c and 23d on the lower end of the orifice plate 23 while the sectional areas of the extrudates are being increased, and these extrudates are fusion-bonded to one another to form a multifilament type plastic optical fiber, in which the cross-sectional shapes of the islands present in the interior are uniform, as shown in FIG. 5 or 6.

If the spinning draft is too high, a strain imposed on the formed optical fiber is drastically increased, and a multifilament type plastic optical fiber having good light-transmitting characteristics cannot be obtained. In order to eliminate this disadvantage, in the present invention, preferably the spinning draft is set at up to 5,000.

In order to improve the light-transmitting characteristics and toughness of the so-prepared multifilament type plastic optical fiber, preferably the optical fiber is heat-treated at a temperature of 100° to 300° C. In view of the relation to the spinning draft, this heat treatment can be carried out while drawing the multifilament type plastic optical fiber at a draw ratio of about 1 to about 3 or under a shrinking relaxation of up to 40%.

Figure 7:
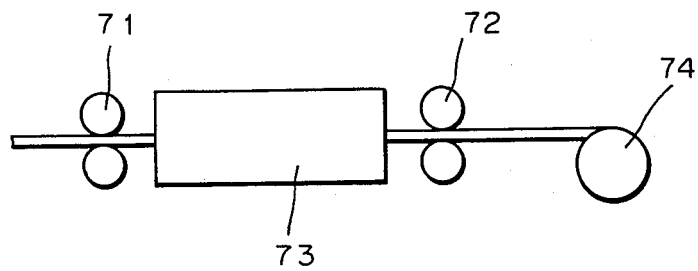
FIG. 7 is a diagram illustrating an example of the apparatus for heat-treating a multifilament type plastic optical fiber.

FIG. 7 illustrates an apparatus to be used for heat-treating the multifilament type plastic optical fiber in the present invention. In FIG. 7, reference numerals 71, 72, 73 and 74 represent a feed roller, a take-up roller, a heat-treating machine and a winder, respectively. The heat-treating machine may be directly connected to the spinning apparatus shown in FIG. 1. In this case, in view of the operation efficiency, preferably one roller is used either as the take-up roll G shown in FIG. 1 or the feed roller 71 shown in FIG. 7.

The cross-section of the multifilament type plastic optical fiber of the present invention can have a substantially rectangular shape as shown in FIG. 5 or 6 or a circular, star-like or other polygonal shape. The spinning holes of the spinneret are arranged so that the intended cross-sectional shape is obtained.

As examples of the plastics for forming the core and sheath components of islands of the multifilament type plastic optical fiber of the present invention, there can be mentioned polymethyl methacrylate (n=1.49), a copolymer (n=1.47 to 1.50) composed mainly of methyl methacrylate, polystyrene (n=1.58), a copolymer (n=1.50 to 1.58) composed mainly of styrene, a styrene/acrylonitrile copolymer (n=1.56), poly-4-methylpentene-1 (n=1.46), an ethylene/vinyl acetate copolymer (n=1.46 to 1.50), a polycarbonate (n=1.50 to 1.57), polychlorostyrene (n=1.61), polyvinylidene chloride (n=1.63), polyvinyl acetate (n=1.47), a methyl methacrylate/styrene, vinyltoluene or $\alpha$-methylstyrene/maleic anhydride terpolymer or quadripolymer (n=1.50 to 1.58), polydimethylsiloxane (n=1.40), polyacetal (n=1.48), polytetrafluoroethylene (n=1.35), polyvinylidene fluoride (n=1.42), polytrifluoroethylene (n=1.40), polyperfluoropropylene (n=1.34), fluoroethylene copolymers or terpolymers (n=1.35 to 1.40), a polyvinylidene fluoride/polymethyl methacrylate blend (n=1.42 to 1.46), copolymers composed mainly of a fluoromethacrylate represented by the general formula $CH_2=C(CH_3)COORf$ in which Rf stands for $(CH_2)_n(CF_2)_nH$ (n=1.37 to 1.42), $(CH_2)_m(CF_2)_nF$ (n=1.37 to 1.40), $CH-(CF_3)_2$ (n=1.38), $C(CF_3)_3$ (n=1.36), $CH_2CF_2CHFCF_3$ (n=1.40) or $CH_2CF(CF_3)_2$ (n=1.37), copolymers of these fluoromethacrylates (n=1.36 to 1.40), copolymers of such a fluoromethacrylate with methyl methacrylate (n=1.37 to 1.43), polymers composed mainly of a fluoroacrylate represented by the general formula $CH_2=CH.COOR'f$ in which R'f stands for $(CH_2)_m(CF_2)_nF$ (n=1.37 to 1.40), $(CH_2)_nH$ (n=1.37 to 1.41), $CH_2CF_2CHF-CF_3$ (n=1.41) or $CH(CH_3)_2$ (n=1.38), copolymers of these fluoroacrylate (n=1.36 to 1.41), copolymers of such a fluoroacrylate and a fluoromethacrylate as described above (n=1.36 to 1.41), copolymers of these fluoroacrylate and fluoromethacrylate with methyl methacrylate (n=1.37 to 1.43), and homopolymers and copolymers (n=1.37 to 1.42) composed mainly of a 2-fluoroacrylate represented by the general formula $CH_2=CF.COOR''f$ in which R''f stands for $CH_3$, $(CH_2)_m(CF_2)_nF$, $(CH_2)_m(CF_2)_nH$, $CH_2CF_2CHFCF_3$ or $C(CF_3)_2$.

As examples of the plastics used as the sea component, there can be mentioned polyamides, polyester elastomers, polyamide elastomers, polystyrene elastomers, polyolefin elastomers, poly-4-methyl-pentene -1, polyvinylidene fluoride, ionomers, ethylene/ethyl acrylate copolymers, ethylene/vinyl acetate copolymers, vinylidene fluoride copolymers, polymethyl methacrylate, polystyrene, ABS, polybutylene terephthalate and polyethylene. In order to obtain a multifilament type plastic optical fiber capable of transferring a sharp and bright image, preferably a polymer having a flowability larger than that of the sheath-forming polymer for forming islands at the spinning step is selected as the sea-forming polymer.

The present invention will now be described in detail with reference to the following examples.

Figure 8:
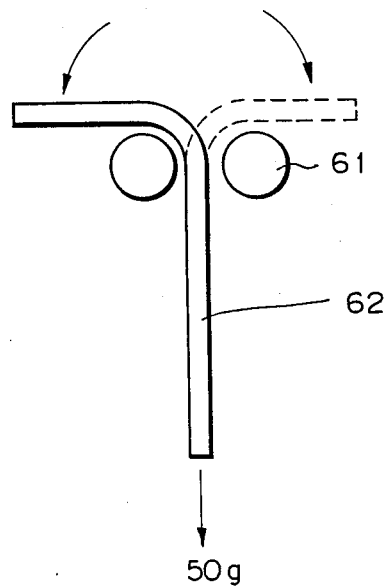
FIG. 8 is a diagram illustrating the repeated bending test.

In the following examples, the softness were measured according to the following methods. Namely, the softness was evaluated by measuring the resistance against repeated bending with an apparatus shown in FIG. 8. Referring to FIG. 8, the multifilament type plastic optical fiber 62 was repeatedly bent around bending rods 61 at a bending radius of 25 mm and a bending angle of 180°, and when the retention ratio of the quantity of transmitted light based on the initial value was lower than 80%, the number of bending repetitions was counted.

EXAMPLE 1

A conjugate spinning spinneret having a sectional structure as shown in FIG. 2 was attached at the part D of the spinning apparatus shown in FIG. 1, and spinning was carried out under conditions shown in FIG. 1 by using polymethyl methacrylate as the core-forming polymer, a fluoroalkyl methacrylate polymer as the sheath-forming polymer and a vinylidene fluoride copolymer as the sea-forming polymer. The spinning operation was controlled so that the sea portions of true conjugate type extrudates were fusion-bonded to one another on the lower end face of the spinneret, whereby a multifilament type plastic optical fiber having a cross-sectional shape as shown in FIG. 5. The characteristics of the obtained multifilament type plastic optical fiber are shown in Table 1.

Multifilament type plastic optical fibers of samples 1 through 9 in Table 1 according to the present invention had good image-transmitting characteristics. However, the multifilament type plastic optical fiber of sample 10 was inferior in the image-transmitting characteristics, and the unevenness of the quantity of transmitted light in the cross-section of the optical fiber was very large.

TABLE 1

| Sample No. | 1 | 2 | 3 | 4 | 5 | 6 | 7 | 8 | 9 | 10 |
|---|---|---|---|---|---|---|---|---|---|---|
| Island Diameter (μ) | 10 | 20 | 25 | 30 | 50 | 80 | 100 | 30 | 10 | 50 |
| Number of Islands in Cross-Section | 3000 | 1500 | 1500 | 1500 | 1350 | 1350 | 1350 | 1350 | 3000 | 1350 |
| Spinning Draft D | 2500 | 1200 | 780 | 540 | 580 | 625 | 730 | 530 | 2500 | 580 |
| Initial Light-Transmitting Characteristics (dB/km) (at 650 mm) | 1500 | 900 | 850 | 750 | 700 | 600 | 500 | 500 | 1400 | 1500 |
| Resistance against Repeated Bending (times) | >1000 | >1000 | >1000 | 550 | 550 | >1000 | >1000 | 550 | >1000 | 450 |
| Sea Occupancy Ratio in Cross-Section (%) | 18 | 17 | 15 | 13 | 13 | 11 | 11 | 25 | 33 | 5 |
| Cross-Sectional Shape of Islands of Core-Sheath Structure | circular | circular | circular | circular | circular | circular | circular | circular | circular | many polygonal shapes |
| Cross-Sectional Shape of Multifilament Optical Fiber | substantially rectangular | substantially rectangular | substantially rectangular | substantially rectangular | substantially rectangular | substantially rectangular | substantially rectangular | substantially rectangular | substantially rectangular | substantially rectangular |
| Remarks | present | present | present | present | present | present | present | present | present | comparison, |

TABLE 1-continued

| Sample No. | 1 | 2 | 3 | 4 | 5 | 6 | 7 | 8 | 9 | 10 |
|---|---|---|---|---|---|---|---|---|---|---|
| | invention | invention | invention | invention | invention | invention | invention | invention | invention | longitudinal cracking readily caused |

EXAMPLE 2

A multifilament type plastic optical fiber having a cross-sectional shape as shown in FIG. 6 was prepared by performing drafting at a draft ratio of 600 and spinning by using a spinneret having 210 holes and a cross-sectional shape as shown in FIG. 2 and using polymethyl methacrylate as the core-forming polymer, a fluoroalkyl methacrylate polymer as the sheath-forming polymer and polymethyl methacrylate as the sea-forming polymer. The light transmission loss was 950 dB/km, the maximum island diameter was 20 μ, the sea occupancy ratio was 13%, the resistance against repeated bending was 700 times.

We claim:

1. A multifilament type plastic optical fiber having a substantially uniform cross-section and an islands-in-sea structure, in which 10 to 10,000 islands are arranged in the sea, the respective islands have a substantially uniform cross-section having a diameter of 10 to 200 μ and the sea occupancy ratio in the cross-section of the optical fiber is 5 to 40%, said optical fiber being prepared by constructing a true conjugate spinning spinneret by (a) an orifice plate having 10 to 10,000 core-forming holes, (b) an orifice plate having 10 to 10,000 sheath-forming holes and (c) an orifice plate having 10 to 10,000 sea-forming holes having an opening expanded downward, the lower ends of every two adjacent sea-forming holes being placed in contact with each other on the lower end face of said orifice plate, so that a fiber comprising the sea and islands having a core-sheath structure is formed by true conjugate spinning without using a filament-gathering orifice plate, supplying a core-forming polymer, a sheath-forming polymer and a sea-forming polymer to respective spinning holes, melt-spinning the polymers under conditions such that the spinning draft D defined by the following formula [I]:

$$D = \text{(hole diameter of core-forming orifice plate)}^2 / \text{(core diameter of multifilament optical fiber)}^2$$

... [I] is 20 to 5,000, fusion-bonding the spun filaments on the lower end face of the spinneret, and taking up the formed fiber.

2. A multifilament type plastic optical fiber having a substantially uniform cross-section and an islands-in-sea structure, in which 10 to 10,000 islands are arranged in the sea, the respective islands have a substantially uniform cross-section having a diameter of 10 to 200 μ and the sea occupancy ratio in the cross-section of the optical fiber is 5 to 40%, said optical fiber being prepared by constructing a true conjugate spinning spinneret by (a) an orifice plate having 10 to 10,000 core-forming holes, (b) an orifice plate having 10 to 10,000 sheath-forming holes and (c) an orifice plate having 10 to 10,000 sea-forming holes having an opening expanded downward, the lower ends of every two adjacent sea-forming holes being placed in contact with each other on the lower end face of said orifice plate, so that a fiber comprising the sea and islands having a core-sheath structure is formed by true conjugate spinning without using a filament-gathering orifice plate, supplying a core-forming polymer, a sheath-forming polymer and a sea-forming polymer to respective spinning holes, melt-spinning the polymers under such conditions that the spinning draft defined by the following formula [1]:

$$D = \text{(hole diameter of core-forming orifice plate)}^2 / \text{(core diameter of multifilament optical fiber)}^2$$

... [I] is 20 to 5,000, fusion-bonding the spun filaments on the lower end face of the spinneret, and heat-treating the formed fiber at a temperature of 100° to 300° C.

3. A multifilament type plastic optical fiber as set forth in claim 1 or 2, wherein the sea occupancy ratio in the cross-section of the optical fiber is 10 to 20%.

4. A multifilament type plastic optical fiber as set forth in claim 1 or 2, wherein the cross-section of the optical fiber has a substantially rectangular shape, and the cross-section of the islands having a core-sheath structure, which are arranged in the cross-section of the optical fiber, has a substantially circular or hexagonal shape and the islands are arranged in a zigzag-stacked structure.

5. A multifilament type plastic optical fiber having a uniform cross-section and an islands-in-sea structure, in which 10 to 10,000 islands are arranged in the sea, the respective islands have a substantially uniform cross-section having a diameter of 10 to 200 μ and the sea occupancy ratio in the cross-section of the optical fiber is 5 to 20%.

6. A multifilament type plastic optical fiber as set forth in claim 5, wherein the the cross-sections of the islands having a core-sheath structure, which are arranged in the cross-section of the optical fiber, have a substantially circular or hexagonal shape, and the islands are arranged in a zigzag-stacked structure.

* * * * *